United States Patent [19]

United States Patent [19]

Frank et al.

[11] Patent Number: 4,837,187
[45] Date of Patent: Jun. 6, 1989

[54] ALUMINA-BASED CORE CONTAINING YTTRIA

[75] Inventors: Gregory R. Frank, Muskegon; Kenneth A. Canfield, Whitehall; Thomas R. Wright, Muskegon, all of Mich.

[73] Assignee: Howmet Corporation, Greenwich, Conn.

[21] Appl. No.: 58,129

[22] Filed: Jun. 4, 1987

[51] Int. Cl.$^4$ ............................................. C04B 35/10
[52] U.S. Cl. ..................................... 501/127; 501/80; 501/81; 501/119; 501/120; 501/121; 106/38.9
[58] Field of Search ................... 106/38.9; 501/80, 81, 501/100, 101, 119, 120, 121, 127

[56] References Cited

U.S. PATENT DOCUMENTS

| | | | |
|---|---|---|---|
| 4,031,177 | 6/1977 | Auriol et al. | 501/119 |
| 4,097,291 | 6/1978 | Huseby et al. | 106/38.9 |
| 4,097,292 | 6/1978 | Huseby et al. | 106/38.9 |
| 4,102,689 | 7/1978 | Borom | 106/38.9 |
| 4,108,672 | 8/1978 | Klug et al. | 106/38.9 |
| 4,108,676 | 8/1978 | Huseby et al. | 106/38.9 |
| 4,134,777 | 1/1979 | Borom | 106/38.9 |
| 4,141,781 | 2/1979 | Greskovich et al. | 156/637 |
| 4,156,614 | 5/1979 | Greskovich et al. | 106/38.9 |
| 4,164,424 | 8/1979 | Klug et al. | 106/38.9 |
| 4,174,973 | 11/1979 | Rhodes et al. | 501/120 |
| 4,178,187 | 12/1979 | Huseby et al. | 106/38.9 |
| 4,191,720 | 3/1980 | Pasco et al. | 106/38.9 |
| 4,191,721 | 3/1980 | Pasco et al. | 106/38.9 |

Primary Examiner—William R. Dixon, Jr.
Assistant Examiner—David M. Brunsman
Attorney, Agent, or Firm—Finnegan, Henderson, Farabow, Garrett & Dunner

[57] ABSTRACT

A ceramic core for use in the investment casting of metals includes, prior to sintering, about 80 w/o to about 86 w/o of a ceramic filler material and about 14 w/o to about 20 w/o of a binder material. The ceramic filler material includes about 66 w/o to about 95 w/o $Al_2O_3$ particles, about 1 w/o to about 20 w/o $Y_2O_3$ particles, about 1 w/o to about 5 w/o of a grain growth inhibiting agent, and the balance a carbon-bearing fugitive filler material. Subsequent to sintering, the ceramic core has a microstructure characterized by the presence of substantially unreacted $Al_2O_3$ particles having a polycrystalline composition consisting essentially of $3Y_2O_3.5Al_2O_3$ on the surfaces of the $Al_2O_3$ particles.

13 Claims, 1 Drawing Sheet

ALUMINA-BASED CORE CONTAINING YTTRIA

FIELD OF THE INVENTION

The present invention relates to the investment casting of metals and, more particularly, to a ceramic core for use in such casting.

BACKGROUND OF THE INVENTION

In casting turbine blades using both single crystal and polycrystalline directional solidification investment casting techniques, ceramic cores are used. To form a turbine blade having the intricate internal passageways required for proper air cooling of the blade, a superalloy is cast around a ceramic core. After the casting has solidified, the ceramic core is chemically leached out of the casting using hot aqueous caustic solutions thus leaving the air cooling passageways in the blade.

The ceramic core used in the casting of superalloys to form turbine blades must be chemically inert with any reactive alloy components of the particular superalloy being cast. The ceramic core must also be capable of being leached out of the casting in a reasonable period of time without damaging the casting. In addition, the ceramic core must possess sufficient dimensional stability to maintain its shape when surrounded by the molten superalloy during solidification. However, the strength of the core must not be so high that hot tearing or recrystallization of the casting occurs during solidification and cooling of the casting.

Other preferable characteristics of the ceramic core include low shrinkage during sintering and a degree of porosity sufficient to provide for crushability of the core during solidification of the casting to reduce the potential for hot tearing and/or recrystallization of the superalloy.

To achieve higher efficiency in a gas turbine engine, it is well known that the operating temperature of the engine must be increased. However, the increase in gas turbine engine operating temperatures is limited by the availability of high temperature materials capable of withstanding these increased operating temperatures.

Recently, a new generation of high melting point superalloys, many of which are reactive with conventional fused silica cores, has been developed. These superalloys are typically cast at temperatures in the range from about 1480° C. to about 1600° C. While these superalloys allow higher operating temperatures and, hence, higher efficiencies to be achieved in gas turbine engines, they present problems in that conventional silica-based ceramic cores cannot withstand the higher temperatures at which these materials are cast.

In particular, typical conventional fused silica, alumina ($Al_2O_3$), and alumina-based cores do not remain dimensionally stable at casting temperatures in excess of about 1480° C. To meet the strict tolerance requirements of the aerospace industry for cast components, the core must remain dimensionally stable at such casting temperatures. Thus, it is apparent that conventional fused silica and alumina-based cores are not suitable for the casting of aerospace components at temperatures in excess of about 1480° C.

Conventional yttria ($Y_2O_3$) cores remain dimensionally stable at higher casting temperatures. However, yttria is extremely expensive and, consequently, the use of yttria cores in large scale production is uneconomical. Moreover, yttria cores have relatively poor leachability using standard caustic solutions.

Core materials formed of mixtures of yttria and alumina are also known in the art. However, single phase core materials such as $3Y_2O_3 \cdot 5Al_2O_3$ (yttria alumina garnet or YAG), presumably due to the presence of relatively large amounts of yttria, have relatively poor leachability using standard caustic solutions.

Consequently, there is a demand for a ceramic core that has excellent leachability and remains dimensionally stable at casting temperatures in excess of 1480° C. It would also be desirable to form such a ceramic core principally form relatively inexpensive raw materials so that it is economical to use cores formed of the material in large scale production.

Accordingly, it is an object of the invention to provide a ceramic core for use in casting that has excellent leachability and remains dimensionally stable at casting temperatures in excess of 1480° C.

Another object of the invention is to provide a ceramic core that is principally formed from relatively inexpensive raw materials so that it is economical to use cores formed of the material in large scale production.

It is a further objective of the invention to provide a ceramic core that remains chemically inert with the reactive alloy components of high melting point superalloys during the casting process.

A still further object of the invention is to provide a ceramic core that can be rapidly sintered and that exhibits minimal shrinkage during sintering.

Additional objects and advantages will be set forth in part in the description which follows, and in part, will be obvious from the description, or may be learned by practice of the invention.

SUMMARY OF THE INVENTION

To achieve the foregoing objects and in accordance with the purpose of the invention, as embodied and broadly described herein, the ceramic core for use in the investment casting of metals of the present invention consists essentially of, prior to sintering, about 80 weight percent (hereinafter "w/o") to about 86 w/o of a ceramic filler material and about 14 w/o to about 20 w/o of a binder material. The ceramic filler material consists essentially of about 66 w/o to about 95 w/o $Al_2O_3$ particles, about 1 w/o to about 20 w/o $Y_2O_3$ particles, about 1 w/o to about 5 w/o of a grain growth inhibiting agent, and the balance a carbon-bearing fugitive filler material. Subsequent to sintering, the ceramic core has a microstructure characterized by the presence of substantially unreacted $Al_2O_3$ particles having a polycrystalline composition consisting essentially of $3Y_2O_3 \cdot 5Al_2O_3$ on the surfaces of the $Al_2O_3$ particles.

Preferably, the grain growth inhibiting agent is MgO powder and the carbon-bearing fugitive filler material is a carbon-bearing powder. The binder material is preferably a thermoplastic wax-based binder system including a base wax, a strengthening wax, an anti-segregation agent, and a dispersing agent.

Preferably, the ceramic filler material consists essentially of about 85 w/o $Al_2O_3$ particles, about 7 w/o $Y_2O_3$ particles, about 2 w/o of a grain growth inhibiting agent, and the balance a carbon-bearing fugitive filler material, at least about 1 w/o of the ceramic filler material being comprised of $Al_2O_3$ particles having an average particle size of about 0.75 to about 3 microns.

DESCRIPTION OF THE PREFERRED EMBODIMENTS

Figure 1:
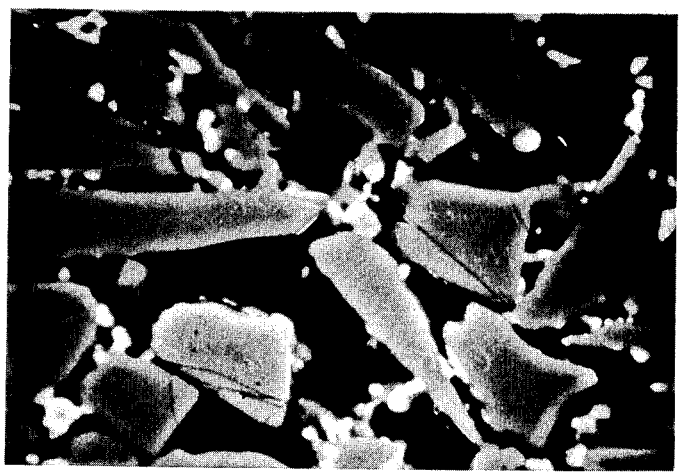
FIG. 1 is a photomicrograph of the microstructure of the ceramic article of the present invention.

Reference will now be made in detail to the present preferred embodiments of the invention, examples of which are illustrated in the accompanying drawing.

In accordance with the invention, the ceramic core for use in the investment casting of metals consists essentially of, prior to sintering, about 80 w/o to about 86 w/o of a ceramic filler material and about 14 w/o to about 20 w/o of a binder material. The ceramic filler material consists essentially of about 66 w/o to about 95 w/o $Al_2O_3$ particles, about 1 w/o to about 20 w/o $Y_2O_3$ particles, about 1 w/o to about 5 w/o of a grain growth inhibiting agent, and the balance a carbon-bearing fugitive filler material. Subsequent to sintering, the ceramic core has a microstructure characterized by the presence of substantially unreacted $Al_2O_3$ particles having a polycrystalline composition consisting essentially of $3Y_2O_3 \cdot 5Al_2O_3$ on the surfaces of the $Al_2O_3$ particles.

The ceramic filler material is prepared by admixing the desired amounts of the $Al_2O_3$, $Y_2O_3$, grain growth inhibiting agent, and fugitive filler material powders together using conventional powder mixing techniques. Preferably, the ceramic filler material consists essentially of about 85 w/o $Al_2O_3$ particles, about 7 w/o $Y_2O_3$ particles, about 2 w/o of a grain growth inhibiting agent, and the balance a carbon-bearing fugitive filler material. The grain growth inhibiting agent is preferably MgO powder, however, other materials including, but not limited to, $Cr_2O_3$ may also be used. The carbon-bearing fugitive filler material is preferably a carbon-bearing powder.

Preferably, the $Al_2O_3$ powder used in forming the ceramic filler material includes both coarse and fine particles. As used herein, the term "coarse particle" denotes a particle having size sufficient so that the particle remains substantially unreacted during sintering of the core. Accordingly, the size of what is considered a coarse particle may vary as the temperatures and times of the sintering process are changed. A suitable mixture of coarse and fine particles in the $Al_2O_3$ powder used in forming the ceramic filler material may be achieved by mixing a course $Al_2O_3$ flour with a fine $Al_2O_3$ powder.

Suitable $Al_2O_3$ starting materials for forming the coarse $Al_2O_3$ flour include Norton-320 Alundum and Norton 38-900 Alundum, both of which may be obtained from the Norton Company of Worcester, Mass. Norton-320 Alundum generally has a particle size distribution of:

| Particle Size | Percentage |
|---|---|
| 0–10 μm | 6.0 w/o |
| 10–20 μm | 20.0 w/o |
| 20–30 μm | 25.0 w/o |
| 30–40 μm | 23.0 w/o |
| 40–60 μm | 17.0 w/o |
| >60 μm | 9.0 w/o |

Norton 38-900 Alundum generally has a particle size distribution of:

| Particle Size | Percentage |
|---|---|
| 0–5 μm | 43.0 w/o |
| 5–10 μm | 30.0 w/o |
| >10 μm | 27.0 w/o |

By way of example, the coarse $Al_2O_3$ flour may be formed entirely from Norton-320 or a mixture of Norton-320 and Norton 38-900. Where the $Al_2O_3$ flour is formed from a mixture of the aforementioned powders, the mixture may include an amount of Norton 38-900 which corresponds to up to 15 w/o of the ceramic filler material.

In forming the coarse $Al_2O_3$ flour, it is desirable that the coarse $Al_2O_3$ powders be acid washed. It has been found that the use of acid washed coarse $Al_2O_3$ powders allows the mixture of the ceramic filler material and the binder material to be satisfactorily injected into all portions of the dies used to mold the mixture into a desired shape. Acid washing imparts the optimum pH level to the course $Al_2O_3$ particles for flowability and compactibility of the material during the molding phase.

Preferably, the ceramic filler material includes both coarse and fine $Al_2O_3$ particles. It is further preferred that at least about 1 w/o of the ceramic filler material is comprised of $Al_2O_3$ particles having an average particle size of about 0.75 to about 3 microns. By way of example, fine $Al_2O_3$ particles may be included in the ceramic filler material by adding an $Al_2O_3$ starting material comprised of fine particles to the coarse $Al_2O_3$ flour. A suitable $Al_2O_3$ starting material comprised of fine particles is Reynolds RC-HPT-DBM TM, which may be obtained from Malakoff Industries, Inc. of Malakoff, Texas. Reynolds RC-HPT-DBM TM, which includes 0.075 w/o MgO, has an average particle size of about 0.75 microns.

Once the ceramic filler material is prepared, it is blended with a suitable binder material. Preferably, the binder material is a thermoplastic wax-based binder system having a relatively low melting point. By way of example, the thermoplastic wax-based binder system may be comprised of about 91 w/o to about 96 w/o of a wax system, about 1 w/o to about 6 w/o of an anti-segregation agent, and about 1 w/o to about 5 w/o of a dispersing agent. A suitable wax system is Okerin 1865Q TM, which has a softening point of approximately 77° C., (available from Dura Commodities Corp. of Harrison, N.Y.) to which up to about 10 w/o of a strengthening wax is added. The strengthening wax is added to the wax system to provide the as-molded core with higher green strength. A suitable strengthening wax is Strahl & Pitsch 462-C TM (available from Strahl & Pitsch, Inc. of West Babylon, N.Y.). A suitable anti-segregation agent is an ethylene vinyl acetate copolymer such as DuPont Elvax 310 TM, available from E. I. DuPont de Nemours Co. of Wilmington, Del. A suitable dispersing agent is oleic acid.

In accordance with the invention, about 80 w/o to 86 w/o of the ceramic filler material is blended with about 14 w/o to about 20 w/o of a binder material to form a ceramic/binder mixture. To form an article having a specific shape such as a core, the ceramic/binder mixture is heated to a temperature in the range from about 80° C. to about 125° C. to render the mixture fluid. The mixture is then injected into a suitable die which, for example, may be formed of aluminum or steel. Pressures in the range from 200 psi to 1500 psi are used in injecting the ceramic/binder mixture into the die. The die may be chilled, at room temperature, or slightly heated depending upon the complexity of the desired core configuration. After the ceramic/binder has solidified, the die is opened and the thus-formed core is removed.

Subsequently, the core is subjected to a prebake treatment. The core is positioned on a ceramic setter contoured to the shape of the core. The ceramic setter, which has a top half and a bottom half, acts as a support for the core and enables it to retain its shape during subsequent processing. After the core is positioned on the bottom half of the ceramic setter, the core is covered with a graphite powder packing material having a relatively fine particle size. During the prebake treatment, the graphite powder packing material serves to physically extract, via capillary action, the binder material from the core. The time and temperature for the prebake treatment are dependent upon the cross-sectional thickness of the core. A suitable prebake treatment lasts approximately 68 hours at a maximum temperature in the range from approximately 232° C. to approximately 288° C.

After the prebake treatment, the graphite packing material is brushed off the core and the bottom half of the ceramic setter. Next, the top half of the ceramic setter is positioned on the bottom half of the ceramic setter to encapsulate the core. Subsequently, the encapsulated core is sintered in an oxidizing atmosphere (i.e., air) to form the sintered core. Preferably, the core is sintered for approximately 48 hours using a heating rate of about 60° C. to about 120° C. per hour up to a sintering temperature in the range from about 1600° C. to about 1700° C.

During sintering, the carbon-bearing fugitive filler material is burned cleanly out of the core. As a result, an interconnected network of porosity is created in the sintered core. The porosity in the core aids both the crushability and leachability of the core after casting and inhibits recrystallization of the alloy. Thus, the core should include an amount of porosity sufficient to allow the core to be leached from the casting using standard hot aqueous caustic solutions in a reasonable period of time. It has been found that an interconnected porosity level of at least about 40 volume percent, and preferably in the range from about 44 to about 49 volume percent, is sufficient for this purpose.

It is believed that the finer $Al_2O_3$ particles contained in the core react and chemically combine with both the $Y_2O_3$ particles and the particles of the grain growth inhibiting agent during sintering. The fine $Al_2O_3$ particles and the $Y_2O_3$ particles react to form $3Y_2O_3.5Al_2O_3$. The grain growth inhibiting agent is added to limit the grain growth of the $Al_2O_3$ materials and, in particular, the coarse $Al_2O_3$ particles by preventing growth of the coarse particles at the expense of adjacent fine particles. When the grain growth inhibiting agent is MgO, some of the fine $Al_2O_3$ particles and the MgO particles react to form $MgAl_2O_4$. The coarse $Al_2O_3$ particles, which react at a slower rate than the finer $Al_2O_3$ particles, remain substantially unreacted during sintering. As a result, subsequent to sintering, the microstructure of the ceramic core material is characterized by the presence of substantially unreacted $Al_2O_3$ particles having a polycrystalline composition consisting essentially of $3Y_2O_3.5Al_2O_3$ on the surfaces of the $Al_2O_3$ particles. When MgO is used as the grain growth inhibiting agent, the polycrystalline composition further includes $MgAl_2O_4$.

Thus, subsequent to sintering, the microstructure of the ceramic core material includes substantially unreacted particles of $Al_2O_3$ and a polycrystalline composition on the surfaces of the particles. As used herein, the term "on the surfaces" encompasses both a continuous layer of the polycrystalline composition over the entire surfaces of the substantially unreacted $Al_2O_3$ particles or a discontinuous layer over portions of the surfaces of the substantially unreacted $Al_2O_3$ particles. As used herein, the term "on the surfaces" includes on the exterior of the substantially unreacted $Al_2O_3$ particles, both where the particles are in contact to form grain boundaries and where the particles are not in contact. This distinct post-sintering microstructure is obtained by including only relatively small amounts of $Y_2O_3$ and MgO in the ceramic filler material and holding the core for a relatively short time at the sintering temperature so that the microstructure of the sintered core does not become a single chemically combined composition.

It is believed that the finest $Al_2O_3$ particles included in the ceramic filler material act as a catalyst for the sintering process to be carried out at lower temperatures and facilitate the formation of the polycrystalline composition consisting essentially of $3Y_2O_3.5Al_2O_3$ and, when the grain growth inhibiting agent is MgO, $MgAl_2O_4$ on the surfaces of the substantially unreacted $Al_2O_3$ particles. It is believed that the polycrystalline composition is formed primarily on the surfaces of the substantially unreacted $Al_2O_3$ particles because the fine $Al_2O_3$ particles react at a faster rate during thermal processing than do the coarse $Al_2O_3$ particles. Thus, the coarse $Al_2O_3$ particles remain substantially unreacted during sintering. Consequently, the sintered core consists essentially of substantially unreacted $Al_2O_3$ particles having a polycrystalline composition consisting essentially of $3Y_2O_3.5Al_2O_3$ on the surfaces of the $Al_2O_3$ particles. When the grain growth inhibiting agent is MgO, the polycrystalline composition further includes $MgAl_2O_4$.

It is believed that the beneficial properties, including low die-to-fired shrinkage, dimensional stability at casting temperatures up to approximately 1600° C., and excellent leachability, of the ceramic core of the present invention are principally due to the presence of the polycrystalline composition consisting essentially of $3Y_2O_3.5Al_2O_3$ on the surfaces of the substantially unreacted $Al_2O_3$ particles. The presence of $3Y_2O_3.5Al_2O_3$ on the surfaces of the substantially unreacted $Al_2O_3$ particles provides the further advantage of rendering the core inert during the casting of the latest generation of superalloys containing reactive metals. Moreover, because the ceramic core contains a relatively small amount of yttria, it is economical to use cores formed of the material in large scale production.

The principles of the present invention described broadly above will now be described with reference to a specific example. A ceramic filler material having the following composition was prepared:

| Component | Weight Percentage |
|---|---|
| Norton-320 Alundum Alumina (acid washed) (>99.5% purity) | 70.20 |
| Norton 38-900 Alundum Alumina (acid washed) (>99.5% purity) | 11.30 |
| Reynolds RC-HPT-DBM ™ Alumina (average particle size of about 0.75 microns) (>99.5% purity) | 3.00 |
| Molycorp Yttria (99.99% pure, | 7.00 |

-continued

| Component | Weight Percentage |
| --- | --- |
| average particle size of about 5.0 microns) | |
| Harwick Standard Chemical Co. MLW grade - 325 mesh Magnesia (>99.5% purity) | 1.90 |
| Union Carbide - 200 mesh GP-195 Carbon Graphite | 6.60 |

Subsequently, a thermoplastic wax-based binder system having the following composition was prepared:

| Component | Weight Percentage |
| --- | --- |
| Okerin 1865Q TM Paraffin Base Wax | 87.60 |
| Strahl & Pitsch 462-C TM Wax | 5.55 |
| DuPont Elvax 310 TM | 3.13 |
| Oleic Acid | 3.72 |

Next, about 84.68 w/o of the ceramic filler material and about 15.32 w/o of the thermoplastic wax-based binder system was substantially uniformly blended together to form a ceramic/binder mixture. The ceramic filler material and the thermoplastic wax-based binder system were blended at approximately 110° C. to render the ceramic/binder mixture fluid. The ceramic/binder mixture was injection molded to form a core, prebaked, and sintered to form cores in accordance with the techniques described above.

The resulting sintered cores had a smooth external core surface. Through testing the cores were found to have the following properties:

Interconnected Porosity Level: 44 to 49 volume percent;
Linear Shrinkage (Die-to-Fired): 1.8% to 2.2%;
Room Temperature Flexural Strength: 2500 psi to 5000 psi;
Bulk Density: 2.0 g/cc to 2.3 g/cc;
Apparent Density: 3.95 g/cc to 4.10 g/cc;
Thermal Expansion at 1500° C.: 1.16%;
Room Temperature Modulus of Elasticity: $4.5 \times 10^6$ psi to $5.75 \times 10^6$ psi.

The thus-formed cores were used in casting a superalloy containing reactive metals at casting temperatures up to approximately 1600° C. The cores remained dimensionally stable throughout the casting operation and no evidence of core breakage was found. The cores were readily leached from the castings using a standard hot aqueous caustic solution in a pressurized vessel in less than 60 hours. After the cores were leached from the castings, the internal passageways in the cast components were examined and found to be extremely smooth. In addition, no evidence of significant reaction between the core and the superalloy was found.

FIG. 1 is a 1000x Scanning Electron Microscope (SEM) photomicrograph of the microstructure of a core formed by thermally processing the ceramic/binder mixture described in the example. As can be seen in FIG. 1, the microstructure of the core is characterized by the presence of substantially unreacted $Al_2O_3$ particles having a polycrystalline composition consisting essentially of $3Y_2O_3.5Al_2O_3$ on the surfaces of the $Al_2O_3$ particles. In FIG. 1, the large, granular, light gray portions are the substantially unreacted $Al_2O_3$ particles. The darker surrounding areas are the interconnected pores in the sintered core. The smaller white portions on the surfaces of the substantially unreacted $Al_2O_3$ particles are the polycrystalline composition consisting essentially of $3Y_2O_3.5Al_2O_3$ and $MgAl_2O_4$. It is believed that these smaller white portions also include some fine $Al_2O_3$ particles which have not reacted during thermal processing. The polycrystalline composition seen in FIG. 1 forms a discontinuous layer over portions of the surfaces of the substantially unreacted $Al_2O_3$ particles including where the particles contact to form the grain bondaries. The presence of $MgAl_2O_4$, $Al_2O_3$, and $3Y_2O_3.5Al_2O_3$ has been confirmed by X-ray diffraction analysis.

SEM generated X-ray maps of the microstructure shown in FIG. 1 for Al and Y, respectively, have confirmed that the large particles in FIG. 1 are Al and that Al and Y are present primarily on the surfaces of the Al particles. Because SEM generated X-ray maps can only detect the cationic element of oxide compounds, it is apparent that the large particles in FIG. 1 are $Al_2O_3$ and that a polycrystalline composition consisting essentially of $3Y_2O_3.5Al_2O_3$ is present on the surfaces of these $Al_2O_3$ particles.

The present invention has been disclosed in terms of preferred embodiments. The invention is not limited thereto and is defined by the appended claims and their equivalents.

What is claimed is:

1. A ceramic core for use in the investment casting of metals consisting essentially of, prior to sintering, about 80 w/o to about 86 w/o of a ceramic filler material and about 14 w/o to about 20 w/o of a binder material, said filler material consisting essentially of about 66 w/o to about 95 w/o $Al_2O_3$ particles, about 1 w/o to about 20 w/o $Y_2O_3$ particles, about 1 w/o to about 5 w/o of a grain growth inhibiting agent, and the balance a carbon-bearing fugitive filler material, said ceramic core, subsequent to sintering, having a microstructure characterized by the presence of substantially unreacted $Al_2O_3$ particles having a polycrystalline composition consisting essentially of $3Y_2O_3.5Al_2O_3$ on the surfaces of said $Al_2O_3$ particles.

2. The ceramic core of claim 1, wherein said grain growth inhibiting agent is MgO particles and, subsequent to sintering, said polycrystalline composition further consisting essentially of $MgAl_2O_4$.

3. The ceramic core of claim 1, wherein at least about 1 w/o of said $Al_2O_3$ particles of said filler material has an average particle size of about 0.75 to about 3 microns.

4. A ceramic core for use in the investment casting of metals consisting essentially of, prior to sintering, about 80 w/o to about 86 w/o of a ceramic filler material and about 14 to about 20 w/o of a binder material, said filler material consisting essentially of about 85 w/o $Al_2O_3$ particles, at least about 1 w/o of said filler material consists essentially of $Al_2O_3$ particles having an average particle size of about 0.75 to about 3 microns, about 7 w/o $Y_2O_3$ particles, about 2 w/o of a grain growth inhibiting agent, and the balance a carbon-bearing fugitive filler material, said ceramic core, subsequent to sintering, having a microstructure characterized by the presence of substantially unreacted $Al_2O_3$ particles having a polycrystalline composition consisting essentially of $3Y_2O_3.5Al_2O_3$ on the surfaces of said $Al_2O_3$ particles.

5. The ceramic core of claim 4, wherein said growth inhibiting agent is MgO particles and, subsequent to sintering, said polycrystalline composition further consists essentially of $MgAl_2O_4$.

6. A sintered ceramic core consisting essentially of substantially unreacted coarse $Al_2O_3$ particles having a polycrystalline composition consisting essentially of $3Y_2O_3.5Al_2O_3$ on the surfaces of said $Al_2O_3$ particles.

7. The sintered ceramic core of claim 6, wherein said polycrystalline composition further consist essentially of $MgAl_2O_4$.

8. The sintered ceramic core of claim 6, wherein said core has an interconnected porosity level of about 44 to about 49 volume percent.

9. The sintered ceramic core of claim 6, wherein said core is dimensionally stable at temperatures up to approximately 1600° C.

10. A sintered ceramic core for use in the investment casting of superalloy materials containing a reactive metal, said core consisting essentially of substantially unreacted $Al_2O_3$ particles having a polycrystalline composition consisting essentially of $3Y_2O_3.5Al_2O_3$ on the surfaces of said $Al_2O_3$ particles.

11. The sintered ceramic core of claim 10, wherein said polycrystalline composition further consist essentially of $MgAl_2O_4$.

12. The sintered ceramic core of claim 10, wherein said core has an interconnected porosity level of about 44 to about 49 volume percent.

13. The sintered ceramic core of claim 10, wherein said core is dimensionally stable at temperatures up to approximately 1600° C.

* * * * *